Oct. 29, 1957 — M. E. SACKETT — 2,811,287
SEED DRILL
Filed June 14, 1954 — 4 Sheets-Sheet 1
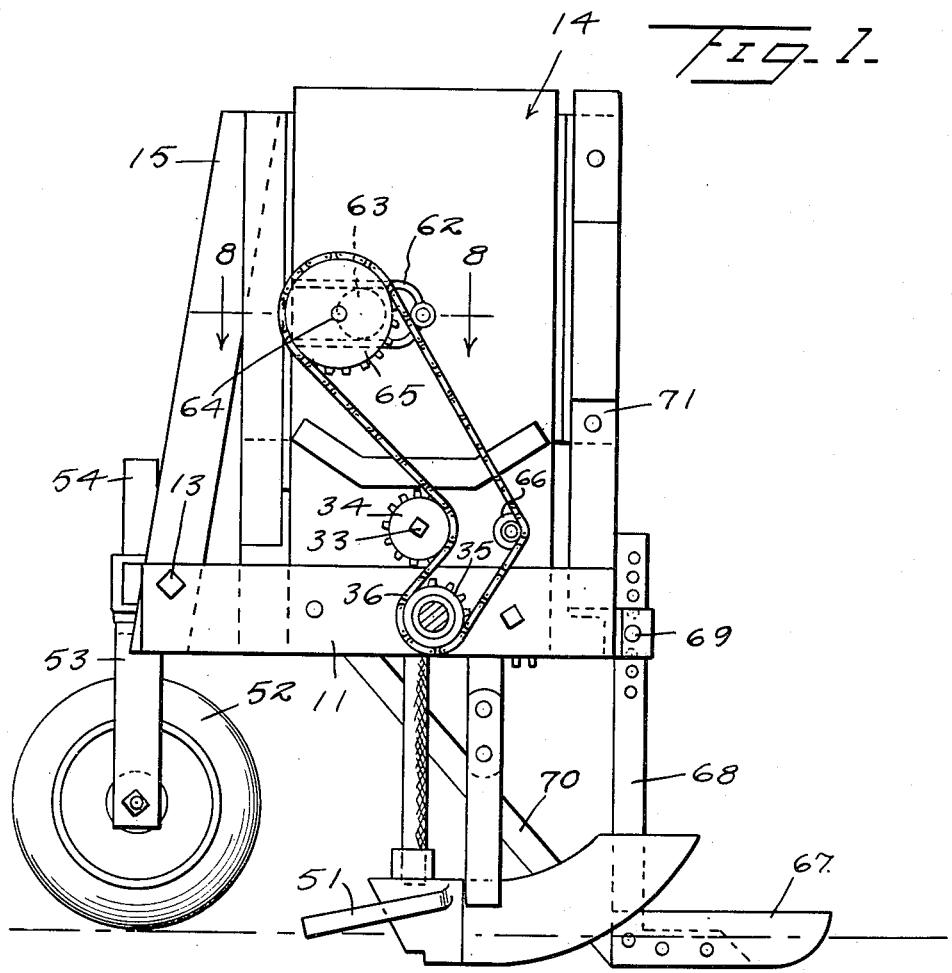
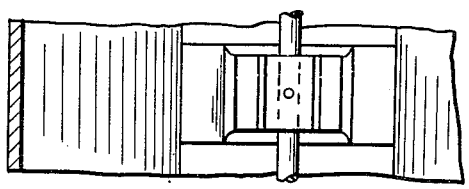
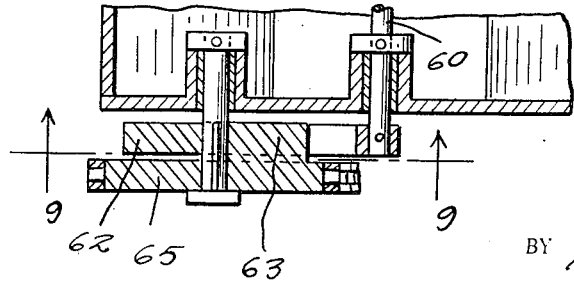
INVENTOR
M. E. Sackett
BY Kimmel & Crowell
ATTORNEYS

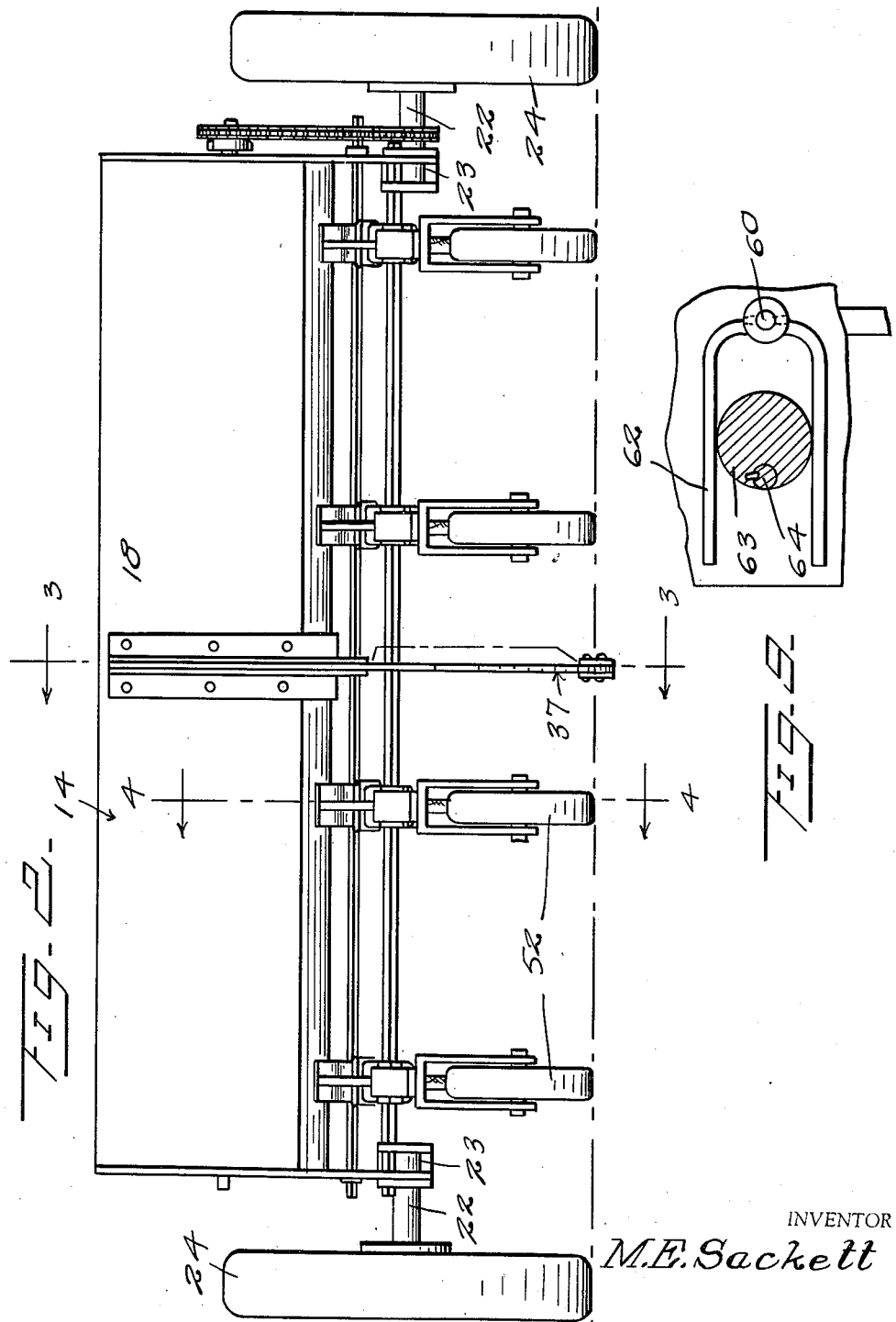

Oct. 29, 1957   M. E. SACKETT   2,811,287
SEED DRILL
Filed June 14, 1954   4 Sheets-Sheet 3
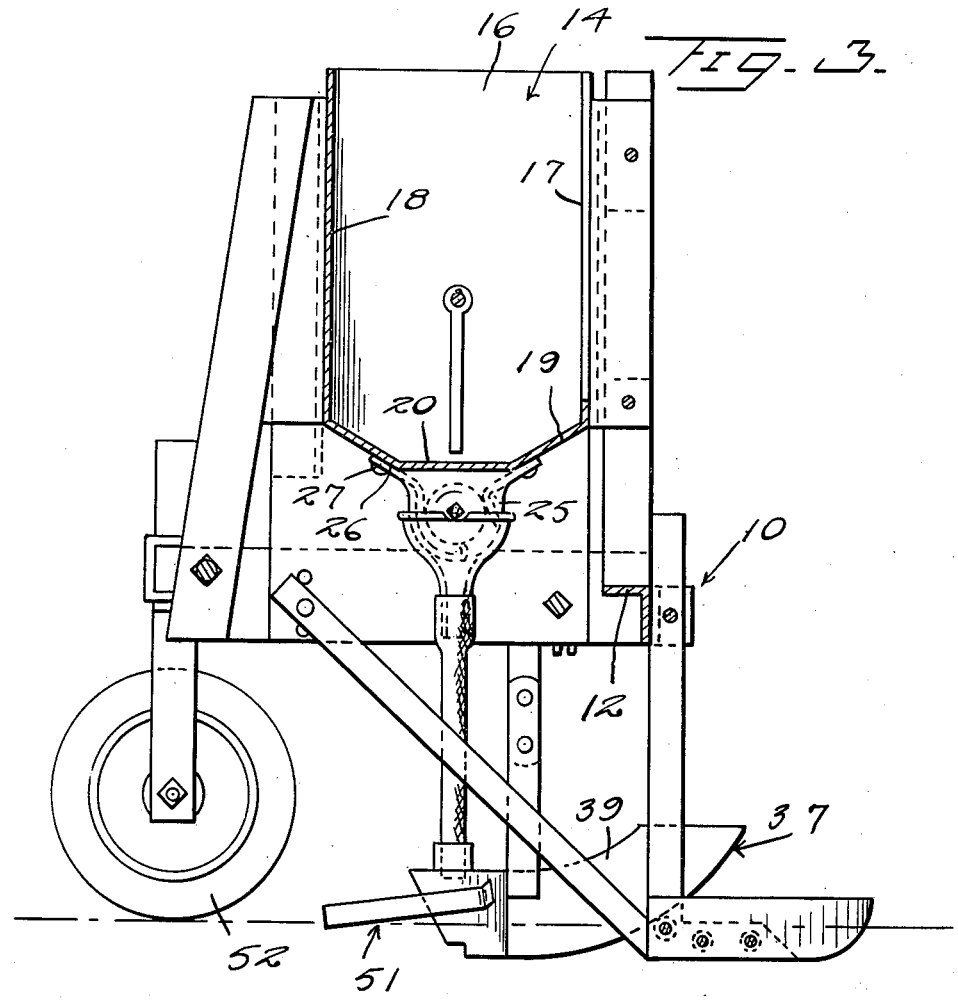
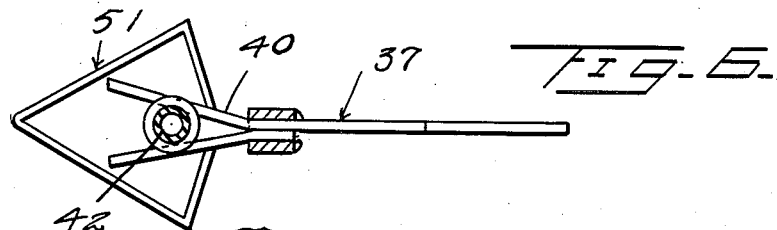
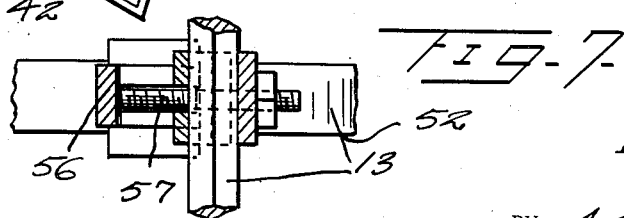
INVENTOR
*M. E. Sackett*
BY *Kimmel & Crowell*
ATTORNEYS

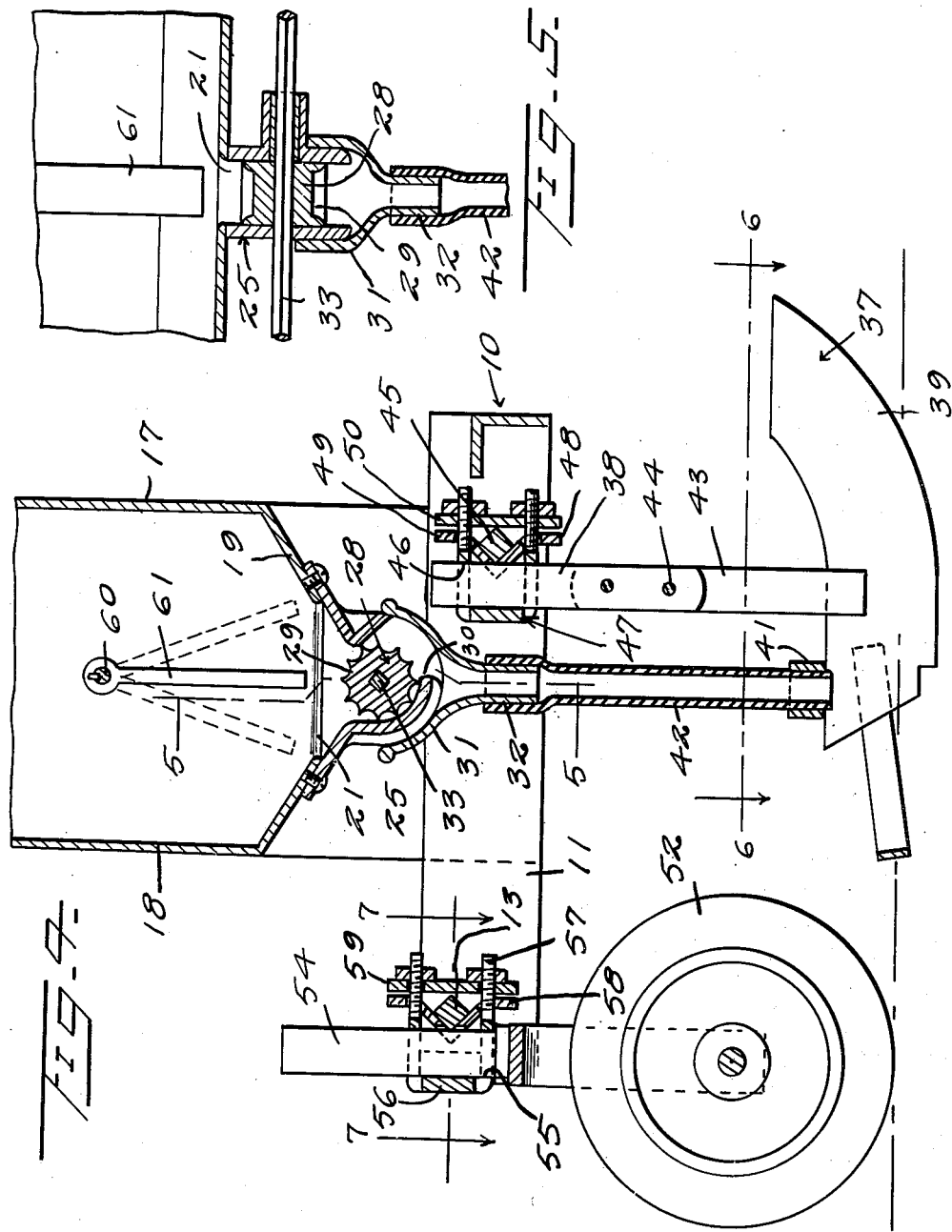

2,811,287

SEED DRILL

Melvin E. Sackett, Twin Falls, Idaho

Application June 14, 1954, Serial No. 436,421

1 Claim. (Cl. 222—231)

This invention relates to a seed drill designed for attachment to a tractor.

An object of this invention is to provide a seed drill embodying a hopper with a plurality of furrow forming blades projecting below the hopper and having connected with the blades end hopper seed guide tubes. The delivery of seed from the hopper to the guide tubes is regulated by means of a rotatable feed means, and an oscillating agitator is disposed in the hopper, there being an oscillating agitator for each feed means.

Another object of this invention is to provide a seed drill of this kind which includes a furrow closing blade projecting from the rear of the furrow forming blade, and a dirt packing wheel is disposed at the rear of the furrow closing blade for packing the loose dirt onto the seed.

With the above and other objects in view, my invention consists in the arrangement, combination and details of construction disclosed in the drawings and specification, and then more particularly pointed out in the appended claim.

In the drawings:

Figure 1 is a detail end elevation partly in section of a seed drill constructed according to an embodiment of this invention.

Figure 2 is a detail rear elevation of the drill.

Figure 3 is a sectional view taken on the line 3—3 of Figure 2.

Figure 4 is a fragmentary sectional view taken on the line 4—4 of Figure 2.

Figure 5 is a fragmentary sectional view taken on the line 5—5 of Figure 4.

Figure 6 is a fragmentary sectional view taken on the line 6—6 of Figure 4.

Figure 7 is a fragmentary sectional view taken on the line 7—7 of Figure 4.

Figure 8 is a fragmentary sectional view taken on the line 8—8 of Figure 1.

Figure 9 is a fragmentary sectional view taken on the line 9—9 of Figure 8.

Referring to the drawings, the numeral 10 designates generally a frame structure embodying end frame members 11, a front cross frame member 12 of angle shape and a rear frame bar 13. A hopper generally designated as 14 is secured between the end members 11 of the frame and is braced relative thereto by a rear bracing bar 15.

The hopper 14 is formed of upright end plates 16 and upright plates 17 and 18 comprising front and rear plates. A downwardly convergent bottom wall 19 is secured to the front and rear plates 17 and 18 and is formed in the horizontal portion 20 thereof with a plurality of spaced openings 21 through which the seed is adapted to drop.

The frame 10 has journalled at each end thereof a pair of spindles 22 carried by bearings 23 and a pair of traction wheels 24 are secured one to each spindle 22. A cup-shaped housing 25 formed with upwardly divergent plates 26 is secured by fastening means 27 to the convergent bottom walls 19. There is a cup 25 for each opening 21, and a seed delivery wheel 28 is rotatably disposed in each housing 25 being formed with a plurality of concave seed receiving recesses 29 whereby one or more seeds may be received in the recesses 29 for delivery through the lower delivery opening 30 in the housing 25.

A funnel shaped guide member 31 is secured to each housing 25 and is formed with a tubular neck 32 extending downwardly therefrom. The seed discharged through the opening 30 drops downwardly through the tube 32. The seed delivery wheel 28 is secured to a rotatable shaft 33 journalled through the end walls 16 of the hopper, and a sprocket 34 is secured to one end of the shaft 33. One of the spindles 22 has fixed thereto a sprocket 35 about which a chain 36 engages, and the chain 36 engages about the sprocket 34. A furrow opening blade 37 is disposed below each housing 25 being secured to a vertical shank 38 which is fixed relative to the frame 10 as will be hereinafter described. The blade 37 is formed of an upwardly curved forward blade member 39 and a pair of rearwardly divergent wings 40 which are disposed in vertical alignment with the funnel shaped member 31.

A nipple or bushing 41 is secured to the wings 40 on the upper edges thereof and a flexible seed guiding tube 42 is secured between the tubular member 32 and the nipple 41. The forward blade member 39 has fixed thereto a pair of upwardly extending bars 43 which are secured to the shank 38 by fastening members 44. A horizontally disposed polygonal bar 45 is fixed between the end plates or members 11 and the shank 38 engages through slots 46 formed in the parallel sides of a U-shaped clamping member 47. The clamping member 47 extends through ears 48 carried by bar clamping members 49 and 50 secured to the bar 45 so that the shank 38 may be vertically adjusted to position the furrow forming blade in the desired position relative to the ground, and the U-shaped clamping member 47 provides a means whereby a furrow forming or opening blade 37 may be transversely adjusted with respect to the frame 10. Each furrow forming or opening blade 37 has secured to the rearwardly divergent wings 40 thereof a V-shaped furrow closing blade 51 whereby the loose dirt moved laterally by the wings 40 will be moved inwardly toward the center of the furrow for closing the furrow and thereby covering the seed dropped down through the guide tube 42 between the wings 40. A dirt packing wheel 52 is rotatably carried by a fork 53 having a shank or a stem 54 extending upwardly therefrom.

The shank or stem 54 extends through aligned opening 55 formed in a U-shaped clamping member 56, and the clamping member 56 includes a pair of threaded studs 57 which engage through a pair of bar clamping plates 58 and 59. The bar clamping plates 58 and 59 engage about the rear horizontal bar 13 and provide a means whereby the packing wheel 52 may be vertically adjusted and may also be laterally or transversely adjusted.

An agitator shaft 60 is journalled through the end walls 16 of the hopper and has secured thereto a plurality of depending agitator blades 61. The agitator shaft 60 has fixed to one end thereof a U-shaped member 62 which engages about an eccentric operator 63. The eccentric operator 63 is of circular form and is fixed to a shaft 64 rotatably carried by the adjacent end wall 16. A sprocket 65 is fixed to the shaft 64 and the chain 36 is extended upwardly from the feeding sprocket 34 to the agitator sprocket 65. The idler wheel 66 is rotatably carried by the adjacent end wall 16 of the hopper and engages the run of the chain 36 opposite from the run of the chain which passes over the feeding sprocket 34.

A guiding or steering blade 67 is secured to an L-shaped shank 68 which is vertically adjusted relative to the frame 10 being secured to the frame 10 by fastening means 69. An upwardly and rearwardly extending brace 70 is secured to the lower end of the shank or stem 68 and is secured at its rear end to the frame structure 10.

There is an agitator 61 for each delivery wheel 29, and the agitator member 61 is adapted to oscillate back and forth over the delivery opening 21.

The frame 10 also includes a hitch or draw bar connecting means 71 projecting upwardly from the frame whereby the frame structure may be secured to the vertically rockable draw bar of the tractor so that the frame structure including the traction wheels may be raised by the draw bar elevating means of the tractor to dispose the said drill in inoperative position with the traction wheels 24 disengaged relative to the ground. When it is desired to operate the seed drill, the device is lowered to the ground whereby the wheels 24 will engage the ground and provide for rotating the seed drill shaft 33 and the oscillator shaft 60.

As the device is moved over the ground the seed will be delivered in the space between the furrow opening wings 40. The furrow closing blades 51 which project rearwardly from the furrow opening wings 40 will move the dirt inwardly to engage over the seeds for closing the furrow, and the rear wheels 52 which are in alignment with the furrow opening blades 37 will pack the loose dirt over the seeds.

What is claimed is:

A seed drill comprising a frame, a hopper carried by said frame, said hopper having a plurality of delivery openings in the bottom thereof, a plurality of cup-shaped seed delivery housings having parallel side walls fixed to the lower side of said bottom and communicating with said delivery openings, a cylindrical delivery member rotatable in each housing between said parallel side walls, said delivery member having a plurality of concave recesses formed in the peripheral surface thereof, with the axis of said concave recesses parallel to the axis of said delivery member, each of said concave recesses intersecting the next adjacent recess to form a sharp edge therebetween, said delivery member completely filling said housing whereby seed may be delivered from said housing only upon rotation of said delivery member, a common shaft for said delivery members, means for rotating said shaft, an agitator shaft in said hopper, a plurality of elongated agitator blades dependingly secured to said agitator shaft and overlying said delivery openings, and means connected with said rotating means for rotating said agitator shaft back and forth to thereby oscillate said agitator blades.

References Cited in the file of this patent

UNITED STATES PATENTS

| | | | |
|---|---|---|---|
| Re. 3,587 | Foster | | Aug. 3, 1869 |
| 29,351 | Bennett | | July 31, 1860 |
| 114,384 | Zeller | | May 2, 1871 |
| 163,748 | Dana | | May 25, 1875 |
| 446,636 | Kirkpatrick et al. | | Feb. 17, 1891 |
| 467,207 | Smith | | Jan. 19, 1892 |
| 642,050 | Murray | | Jan. 23, 1900 |
| 860,695 | Rowell | | July 23, 1907 |
| 1,303,222 | Stevens et al. | | May 6, 1919 |
| 1,497,772 | Conklin | | June 17, 1924 |
| 2,429,841 | Philips | | Oct. 28, 1947 |